United States Patent [19]
Chatfield et al.

[11] Patent Number: 4,802,730
[45] Date of Patent: Feb. 7, 1989

[54] OPTICAL FIBER CABLES FOR MOTOR VEHICLE ENGINE COMPARTMENT APPLICATIONS

[75] Inventors: Philip A. Chatfield, West Haven; Eugene Shapiro, Hamden, both of Conn.

[73] Assignee: Olin Corporation, New Haven, Conn.

[21] Appl. No.: 929,094

[22] Filed: Nov. 10, 1986

[51] Int. Cl.$^4$ ............................................. G02B 5/14
[52] U.S. Cl. ........................................ 350/96.23; 165/51
[58] Field of Search ................... 350/96.23; 123/416; 165/53, 51

[56] References Cited

U.S. PATENT DOCUMENTS

| | | | |
|---|---|---|---|
| 4,089,585 | 5/1978 | Slaughter et al. | 350/96.23 |
| 4,141,623 | 2/1979 | Dubost et al. | 350/96.23 |
| 4,143,942 | 3/1979 | Anderson | 350/96.23 |
| 4,156,104 | 5/1979 | Mondello | 174/70 R |
| 4,199,224 | 4/1980 | Oestreich | 350/96.23 |
| 4,227,770 | 10/1980 | Gunn | 350/96.23 |
| 4,239,336 | 12/1980 | Parfree et al. | 350/96.23 |
| 4,272,155 | 6/1981 | Slaughter | 350/96.23 |
| 4,278,835 | 7/1981 | Jackson | 174/70 R |
| 4,332,436 | 6/1982 | Adorni et al. | 350/96.23 |
| 4,349,243 | 9/1982 | Amano et al. | 350/96.23 |
| 4,371,234 | 2/1983 | Parfree et al. | 350/96.23 |
| 4,375,313 | 3/1983 | Anderson et al. | 350/96.23 |
| 4,390,589 | 6/1983 | Geyling et al. | 428/381 |
| 4,407,561 | 10/1983 | Wysocki | 350/96.3 |
| 4,416,508 | 11/1983 | Dey et al. | 350/96.23 |
| 4,437,729 | 3/1984 | Parfree et al. | 350/96.23 |
| 4,461,540 | 7/1984 | Fraken | 350/96.23 |
| 4,477,147 | 10/1984 | Winter et al. | 350/96.23 |
| 4,490,009 | 12/1984 | Nakai et al. | 350/96.23 |
| 4,508,423 | 4/1985 | Winter et al. | 350/96.23 |
| 4,547,774 | 10/1985 | Gould | 340/854 |
| 4,555,054 | 11/1985 | Winter et al. | 228/148 |
| 4,557,559 | 12/1985 | Winter | 350/96.23 |
| 4,568,144 | 2/1986 | Occhini et al. | 350/96.23 |
| 4,573,253 | 3/1986 | Smith et al. | 29/460 |
| 4,577,925 | 3/1986 | Winter et al. | 350/96.23 |
| 4,579,420 | 4/1986 | Winter et al. | 350/96.23 |
| 4,594,766 | 6/1986 | Smith, Jr. et al. | 29/460 |

FOREIGN PATENT DOCUMENTS

| | | |
|---|---|---|
| 1172272 | 11/1969 | United Kingdom . |
| 1583520 | 1/1981 | United Kingdom . |
| 2063502A | 6/1981 | United Kingdom . |
| 1592192 | 7/1981 | United Kingdom . |
| 2088583 | 6/1982 | United Kingdom . |
| 2091903 | 8/1982 | United Kingdom . |
| 2105867A | 3/1983 | United Kingdom . |
| 2105483A | 3/1983 | United Kingdom . |

Primary Examiner—Stanley D. Miller
Assistant Examiner—Richard Roseen
Attorney, Agent, or Firm—Gregory S. Rosenblatt; Paul Weinstein

[57] ABSTRACT

The present invention relates to an optical fiber cable for use in motor vehicle applications. The cable comprises at least one optical fiber encapsulated within a tubular structure formed from a metal or metal alloy having a thermal conductivity in excess of about 20 BTU/ft$^2$/ft/hr/°F. at 68° F. The metal tube surrounding the optical fiber(s) functions as a heat sink for conducting heat away from the fiber(s).

13 Claims, 1 Drawing Sheet

OPTICAL FIBER CABLES FOR MOTOR VEHICLE ENGINE COMPARTMENT APPLICATIONS

The present invention relates to an optical fiber cable having utility in motor vehicle applications.

Optical fiber cables have been used in a wide variety of applications including data transmission links and telecommunications. Many of these applications require the optical fiber cable to have a structure for protecting the fragile optical fibers from the exterior environment, and/or from extremes of temperature and/or pressure. For example, optical fiber cables used in submarine telecommunication applications are typically designed with a hermetic tubular structure surrounding an optical fiber core. These protective tubular structures are formed either by a plastic layer extruded about the optical fiber core or a sealed metallic tubular structure in which the core is encapsulated. U.S. Pat. No. 4,143,942 to Anderson illustrates one such cable construction having a plastic layer surrounding an optical fiber core. In addition to serving as a protective structure, the plastic layer functions as a sort of heat barrier.

The metal encapsulation of optical fiber(s) has been found to be particularly desirable in cable applications requiring high strength properties as well as hermeticity. For example, submarine cables often have a metal tube surrounding a number of optical fibers to protect the fibers from the relatively high hydrostatic pressures encountered by the cable when it is laid on the seafloor. In many cable constructions, the metal encapsulation tube also functions as an electrical conductor for transmitting data and/or powering electrical devices such as sensors, motors and/or repeaters. U.S. Pat. Nos. 4,141,623 to Dubost et al., 4,156,104 to Mondello, 4,227,770 to Gunn, 4,278,835 to Jackson, and 4,375,313 to Anderson et al., U.K. Pat. Nos. 1,172,272 to Kao et al., 1,592,192 to Dean, and 2,063,502 to Parfree et al., and U.K. Patent Publication No. 2,105,483A to Worthington et al. illustrate some of the optical fiber cable constructions incorporating metallic protective structures.

New and different uses for optical fiber cables are just beginning to come to light. As these new uses are identified, pre-existing cable constructions are being modified. Recently, a new application for optical fibers has been found in the automotive industry. Modern automobiles increasingly use digital processors to control engine operation. Automobile manufacturers have encountered problems in using ordinary electrical connectors to connect these digital processors with sensors and the like because of the relatively high level of electrical noise present in most automobiles. Optical fibers become attractive for communication between sensors, the operator and the digital processors because of their insensitivity to electrical interference.

Cost factors generally mandate the use of large diameter plastic fibers for the connections between the digital processors and their sensors. The plastic fibers currently available are temperature sensitive. When placed in close proximity to a heat source such as an engine, these fibers may be subject to damage and performance degradation by the temperatures encountered at localized points within an engine compartment. Consequently, if these fibers are to be used, it is necessary to provide some mechanism for protecting the fiber(s) from localized extremes of temperature or hot spots.

Accordingly, it is an object of the present invention to provide an optical fiber cable having means for protecting optical fiber(s) from potential temperature damage and degradation.

It is a further object of the present invention to provide an optical fiber cable as above suitable for use in automotive applications.

These and other objects and advantages will become more apparent from the following description and drawings in which like reference numerals depict like elements.

The present invention relates to an optical fiber cable having utility in applications where the optical fiber(s) require protection from localized extremes of temperature. While the cable construction of the present invention was designed for use in automotive applications, it may be used in other environments, such as jet engine applications, where it is important to conduct heat away from temperature sensitive optical fibers. The optical fiber cable of the present invention comprises one or more optical fibers encapsulated within a tube formed from a metallic material having a thermal conductivity greater than about 20 BTU/ft$^2$/ft/hr/°F. at 68° F. and preferably a relatively high thermal conductivity greater than about 100 BTU/ft$^2$/ft/hr/°F. at 68° F. As used herein, the term metallic material refers to a metal or metal alloy having the desired thermal conductivity. It has been found that a tube formed from such a metallic material acts as a high conductivity heat sink for conducting heat at localized temperature points or hot spots away from the encapsulated fiber(s). In a most preferred embodiment of the present invention, the metal or metal alloy forming the encapsulation tube has a thermal conductivity greater than about 200 BTU/ft$^2$/ft/hr/°F. at 68° F.

As previously discussed, the present invention relates to an optical fiber cable construction having utility in environments such as an automobile engine compartment where optical fiber(s) may be exposed to relatively high, localized temperatures. As previously discussed, it is important in these environments to provide a mechanism for conducting heat away from the optical fiber(s) and thereby preventing heat related damage to and/or degradation of the fiber.

Figure 1:
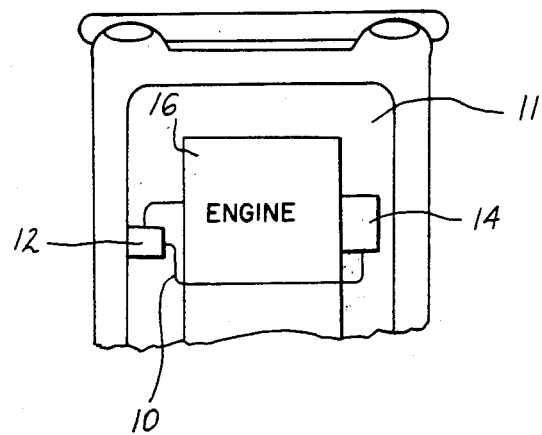
FIG. 1 is a schematic representation of an automobile engine compartment having an optical fiber cable connecting two electrical devices.

FIG. 1 illustrates one application for the optical fiber cables of the present invention. This application is in an automobile engine compartment 11 as a connection between a number of electrical and/or electronic components such as a digital processor 12 for controlling the operation of an automobile engine 16 and a sensor 14 for sensing an operating parameter of the engine. The manner in which the processor 12 controls the engine 16 and the sensed parameter does not form part of the present invention. While the optical fiber cable 10 will be discussed in the context of connecting specific electrical and/or electronic devices, it should be recognized that the cable 10 may be used to connect many different electrical and/or electronic devices and/or control mechanisms. For example, the optical fiber cables of the present invention may be used to connect a manual or automatic controller and the headlights on the vehicle.

When the cable 10 is positioned in close proximity to a heat source, such as the engine 16, the optical fibers within the cable may be subjected to potentially damaging localized regions of relatively high temperatures or hot spots. It thus becomes important to provide the cable 10 with some mechanism for conducting the localized heat away from the fiber(s).

Figure 2:
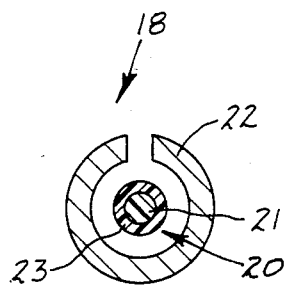
FIG. 2 is a cross sectional view of a first optical fiber cable construction.

FIG. 2 illustrates an optical fiber cable construction 18 suitable for use in automotive applications. The optical fiber cable 18 broadly has one or more optical fibers 20 loosely housed within a metallic tubular member 22. While any conventional optical fiber known in the art may be encapsulated within the cable 18, plastic fibers having a plastic buffer material surrounding a plastic fiber core are preferred. As previously mentioned, this type of fiber is preferred because of economic considerations.

The metallic tubular member 22 is primarily intended to function as a high conductivity heat sink for dissipating heat. In order to function in this capacity, the member 22 is formed from a metal or metal alloy having a thermal conductivity greater than about 20 $BTU/ft^2/ft/hr/°F.$ at 68° F., preferably a relatively high thermal conductivity in excess of about 100 $BTU/ft^2/ft/hr/°F.$ at 68° F. For some applications, it is desirable to form the tubular member 22 from a metal or metal alloy having a thermal conductivity greater than about 200 $BTU/ft^2/ft/hr/°F.$ at 68° F. Suitable metals for the tubular member 22 include copper and copper alloys C11000, C12200, C151, C19400, C63800, and C19500. While copper alloys are a preferred material for the tubular member 22, other metals or metal alloys including iron and iron alloys such as steels having the desired thermal conductivity properties may be used. In addition to functioning as a heat sink, the tubular member 22 serves as a protective structure for preventing damage to the fibers due to handling during manufacturing operations and service.

With respect to its other physical properties, the tubular member 22 may have any desired inner and outer diameter as well as any desired wall thickness. For example, a suitable cable may have a tubular member 22 with an inner diameter of 0.097 inches and a wall thickness of 0.014 inches housing a plastic optical fiber 21 having a 1000 $\mu m$ outer diameter and a 0.087 inch outer diameter polyethylene coating 23. Of course, the physical dimensions of the tube are related to the number of fibers to be encapsulated.

To achieve the goal of preventing heat damage of the fiber(s) 20, it is desirable to loosely house the fiber(s) within the tubular member 22. As used herein, the term loosely housed means that the fiber(s) are in spaced relation with the inner wall of the tubular member. If desired, one or more spacers not shown may be used to maintain a spacing between the fiber(s) 20 and the inner wall of the member 22. If used, the spacers may be formed from any suitable thermal insulating material known in the art. Alternatively, the fiber(s) 20 may be wrapped or encapsulated within a suitable thermal insulator not shown.

Figure 3:
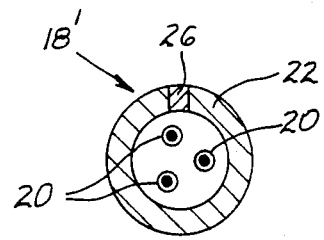
FIG. 3 is a cross sectional view of an alternative optical fiber cable construction.

It may be necessary in certain applications to further protect the fiber(s) 20 within the cable 18 from the exterior environment such as in those environments containing water and/or moisture. As shown in FIG. 3, the tubular member 22 in cable 18 may be a sealed member. Any suitable sealing material 26 known in the art such as a solder or a brazing material may be used to seal the member 22. When used, it is desirable for the sealing material to have a melting temperature well above the temperatures to be encountered during cable service.

Any suitable technique known in the art may be used to form the cable 18. For example, a strip of metal or metal alloy may be passed through a tube forming device at the same time that the fiber or fibers to be encapsulated are fed through the device so as to form a tube about the fiber(s). The tube forming device may comprise any suitable means known in the art such as one or more forming dies and/or roll forming devices. Whichever tube forming apparatus is utilized, it is preferred to form a tube having a generally longitudinally extending seam. By forming such a tube, one is able if necessary to spread the tube walls apart and gain access to the fiber(s). This is highly desirable from a service standpoint.

As previously discussed, the cable 18 may have a sealed construction if desired. Here again, any suitable means for sealing the tube may be utilized. For example, the tube 18 and the fiber(s) 20 therein may be pulled through a bath of molten sealing material.

Techniques suitable for forming the cables of the present invention are discussed in more detail in U.S. Pat. Nos. 4,477,147 to Winter et al., 4,508,423 to Winter et al., 4,555,054 to Winter et al., 4,557,559 to Winter, 4,573,253 to Smith et al., and 4,577,925 to Winter et al. and in U.S. patent application Ser. No. 618,271, filed June 7, 1984, to Winter et al., which are hereby incorporated by reference herein.

If desired, the cable 18 may be formed by starting with a preformed structure such as a metal strip having a U-shaped cross section, placing the fiber(s) within the strip, and closing the open portions of the strip about the fiber(s) to form the tubular member 22. Alternatively, the tubular member 22 may be formed by a layer of metal tape helically or spirally wound about the optical fibers.

While not necessary, the tubular member 22 may be surrounded by a non-metallic protective layer not shown if desired. For example, the tubular member 22 may be encapsulated within a plastic material such as polyethylene.

In cable constructions having a plurality of optical fibers, each fiber could be protected by its own tubular member if desired.

The patents, patent application and foreign patent publications set forth in the specification are intended to be incorporated by reference herein.

It is apparent that there has been provided in accordance with this invention an optical fiber cable for motor vehicle applications which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed:

1. A compartment containing:
    a source of heat comprising an engine;
    first and second electrical or electronic devices; and
    an optical fiber cable for connecting said devices, said cable having at least one optical fiber and means for conducting heat away from said optical fiber.

2. The compartment of claim 1 wherein said compartment comprises an automobile engine compartment.

3. The compartment of claim 1 further comprising each said fiber being formed from a plastic material.

4. The compartment of claim 1 wherein:
said first device comprises a sensor; and
said second device comprises a processor.

5. A compartment containing:
a source of heat;
first and second electrical or electronic devices;
an optical fiber cable for connecting said devices, said cable having at least one optical fiber and means for conducting heat away from said optical fiber;
said conducting means comprising a metal or metal alloy tube surrounding said optical fiber; and
said tube being formed from a metal or metal alloy having a thermal conductivity in excess of about 20 BTU/ft.$^2$/ft./hr./°F. at 68° F.

6. The compartment of claim 5 further comprising each said fiber being formed from a plastic material and wherein said source of heat comprises an engine.

7. The compartment of claim 5 wherein:
said first device comprises a sensor; and
said second device comprises a processor.

8. A compartment containing:
a source of heat;
first and second electrical or electronic devices;
an optical fiber cable for connecting said devices, said cable having at least one optical fiber and means for conducting heat away from said optical fiber;
said conducting means comprising a metal or metal alloy tube surrounding said optical fiber;
said tube having a seam;
a means for sealing said seam for protecting said optical fiber from the exterior environment; and
said tube seam extending in a generally longitudinally extending direction.

9. The compartment of claim 8 further comprising each said fiber being formed from a plastic material and wherein said source of heat comprises an engine.

10. The compartment of claim 8 wherein:
said first device comprises a sensor; and
said second device comprises a processor.

11. A compartment containing:
a source of heat comprising an engine;
first and second electrical and electronic devices;
an optical fiber cable for connecting said devices, said cable having at least one optical fiber and means for conducting heat away from said optical fiber; and
said conducting means comprising a metal or metal alloy tube surrounding each said fiber.

12. The compartment of claim 11 further comprising each said fiber being formed from a plastic material.

13. The compartment of claim 11 wherein:
said first device comprises a sensor; and
said second device comprises a processor.

* * * * *